J. E. BENNETT.
LOCOMOTIVE.
APPLICATION FILED APR. 22, 1907.

1,178,899.

Patented Apr. 11, 1916.
8 SHEETS—SHEET 1.

Witnesses:

Inventor,
James Edward Bennett

J. E. BENNETT.
LOCOMOTIVE.
APPLICATION FILED APR. 22, 1907.

1,178,899.

Patented Apr. 11, 1916.
8 SHEETS—SHEET 3.

Witnesses:

Inventor,
James Edward Bennett,

J. E. BENNETT.
LOCOMOTIVE.
APPLICATION FILED APR. 22, 1907.

1,178,899.

Patented Apr. 11, 1916.
8 SHEETS—SHEET 8.

Inventor,
James Edward Bennett
By Walter Allen
Attorney

UNITED STATES PATENT OFFICE.

JAMES EDWARD BENNETT, OF MOMENCE, ILLINOIS.

LOCOMOTIVE.

1,178,899.     Specification of Letters Patent.     Patented Apr. 11, 1916.

Application filed April 22, 1907. Serial No. 369,568.

*To all whom it may concern:*

Be it known that I, JAMES E. BENNETT, a citizen of the United States of America, residing at Momence, in the county of Kankakee and State of Illinois, have invented certain new and useful Improvements in Locomotives, of which the following is a specification, reference being had therein to the accompanying drawing.

My invention relates to locomotives and has for its object to provide a locomotive of great power and steam capacity, capable of producing large quantities of steam quickly, and feeding the same directly to a plurality of engine units, adapted to work harmoniously and unitedly drive a single running gear.

My invention comprises the provision of a boiler extended or of such length as to cover and furnish steam for several complete sets of engine-gear units, having tubes of such a shape as to improve the draft of the furnace and the production of steam, and piping suitable for the independent rapid delivery of steam to the several sets of engine-gear units.

My invention also comprises the provision of a multiplicity of sets of engine-gear units each containing improved steam-valve-mechanism and collectively connected in such a way as to work harmoniously in the operation of driving a single pair of sets of drive-wheels.

Other and minor features of flue construction and packing construction also contribute to the general effect but are not claimed.

My invention also comprises the provision on each side of a locomotive of a plurality of cylinders and steam chests fed individually and independently from the boiler, controlled collectively by improved valve-mechanism and coupled by improved means to a single pair of sets of driving wheels, whereby the several powers are caused to work unitedly and in harmony.

By an engine-gear unit I mean a cylinder, piston, and valves, and the usual accessories accompanying such for converting the steam pressure admitted to the cylinder into power against the pitman or driving rod attached to the wheels of the vehicle being moved. A set of engine-gear units as used in this specification would comprise such a unit for each side of the vehicle in a locomotive of the usual type, and a unit on the middle line of the vehicle in the case of a monorail vehicle. A triple set of engine-gear units would be three such units suitably connected for one side of the vehicle and three such units suitably connected for the other side of the vehicle in a locomotive of the usual type, and three such units suitably connected on the middle line of the vehicle in the case of a monorail vehicle. The idea is the same in all cases. A plurality of such units are connected to a common equalizing means so that a half-set or the units on one side of the vehicle are connected together to act in unison, as if a single unit, upon a single pitman rod and a single coupling rod.

In the drawings, Fig. 7 is a longitudinal section of the boiler showing the fire tubes tapering from front to rear for improving the draft toward the front end and accommodating more water at the rear end. Fig. 8 is a side elevation of the locomotive constructed in accord with my invention as set forth in Figs. 1 and 4 showing the necessary modification of valve-operating-mechanism. Fig. 9 is a front elevation, partly in section, of the same style.

12 is a side elevation, with the cylinders in section, showing the style illustrated in Figs. 1, 2, 6 and 7, modified to the extent that the triple sets of engine-gear units comprise cylinders tandem instead of parallel. Fig. 17 is a transverse section through the high pressure cylinders of the style shown in Figs. 10, 11 and 14, showing an integral construction. Fig. 18 is a transverse section through the low pressure cylinders of the style shown in Figs. 10, 11 and 14, and showing an integral construction.

Referring to the drawings generally 1 is the boiler, of the length to supply the required steam, 2 the smoke box, 3 the forward engine arch, 4 the steam chests, 5 the cylinders, 6 the valve operating rods, 7 the pistons, 8 the cross-heads, 9 the slides, 10 the drop braces, 11 the pitman rods, 12 the coupling rods, 13 the drive-wheels, 14 the waste cocks of the cylinders, 15 the main steam supply pipes, 16 the branch steam supply pipes, 17 the slide valves, 18 the steam inlet ports, 19 (see Fig. 2) the equalizing cross-bar connecting the valve-rods, 20 the equalizing cross-bar for the piston rods, 21 the steam outlet ports, 22 the branch exhaust pipes, 23 the main exhaust pipe, 24 the stack, 25 the oiling devices for the valve-piston rods, 26 the steam packing box and piston brace, 27 the means for operating the waste cocks of the cylinders, 28 the means for operating the valve rods from the drive-wheel connections, 29 the means for coupling the valve-rods and piston-rods cross-heads, 30 the piston heads, 31 the protecting space for the steam supply pipes, 32 the drop steam and protecting space of the boiler and 33 the boiler tubes.

Figure 1:
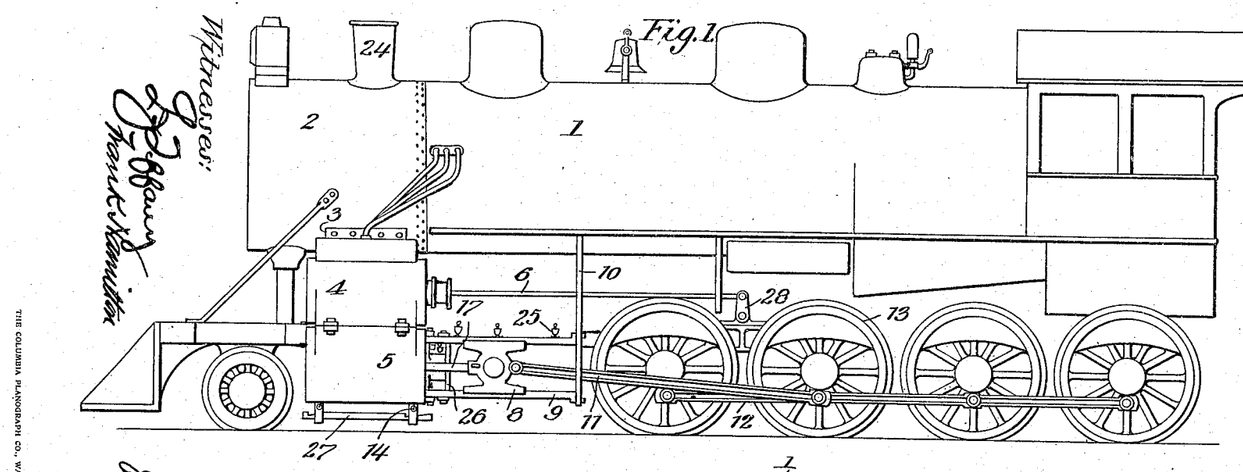
Figure 1 is an elevation of a locomotive constructed in accord with my invention and comprising three pairs of engine-gear units coupled to form a right and a left triple set, each triple set connected to a single set of drive-wheels.
Figure 2:
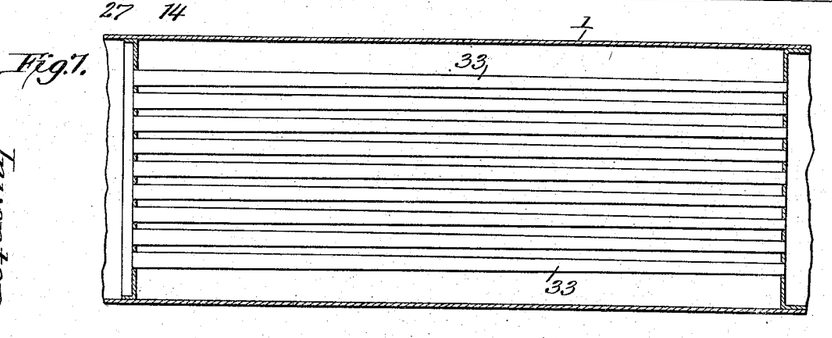
Fig. 2 is a detail illustration showing the method of coupling the members into a right and a left triple set.
Figures 2, 3, 4:
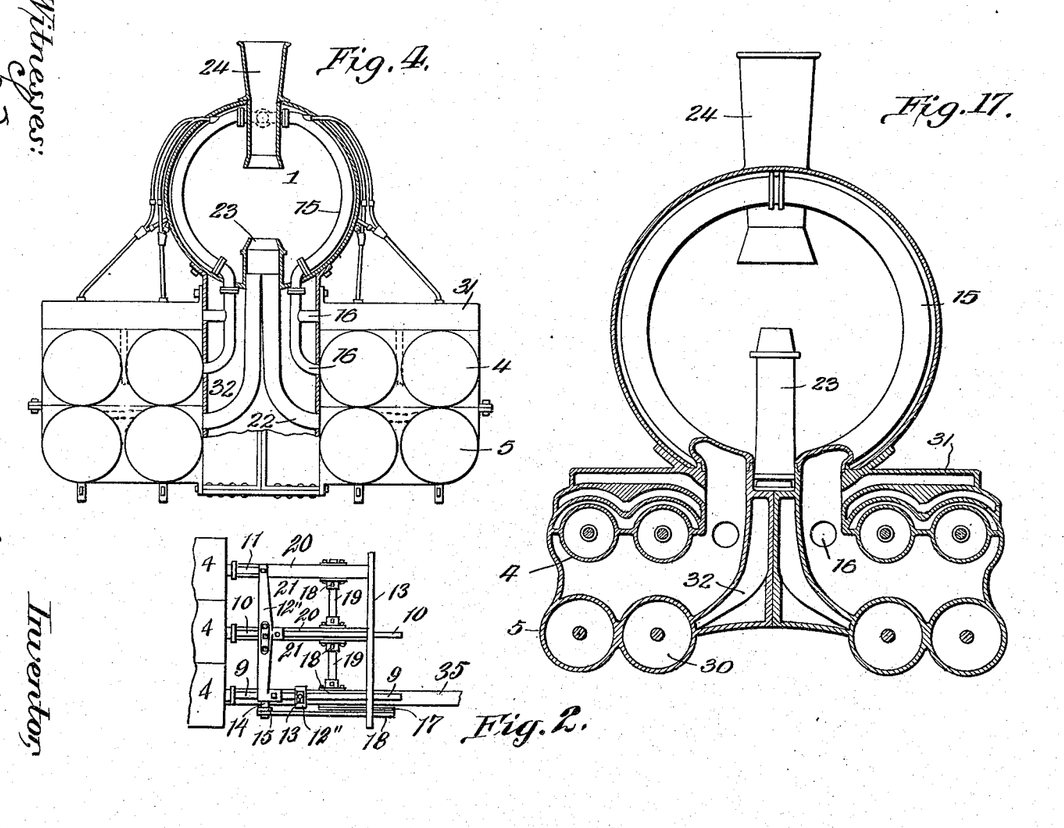
Fig. 3 is a detail of a combined piston rod brace and packing used in my invention.
Fig. 4 is a fragmentary front view showing the feeding arrangement for right and left double sets.
Figure 3:
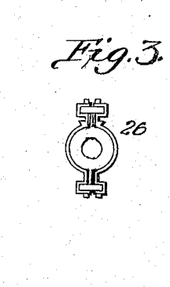
Figure 5:
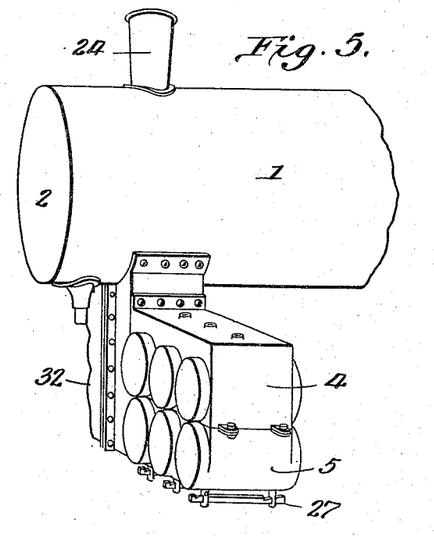
Fig. 5 is a perspective view of triple sets of engine-gear units modified to the extent that the cylinders are made integral and the steam chests are also made integral.
Figure 6:
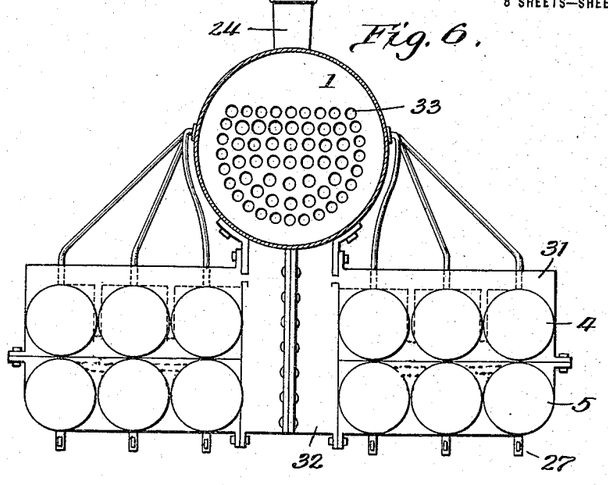
Fig. 6 is a front view of a locomotive provided with an outfit of the style shown in Fig. 5.
Figures 8, 9, 12:
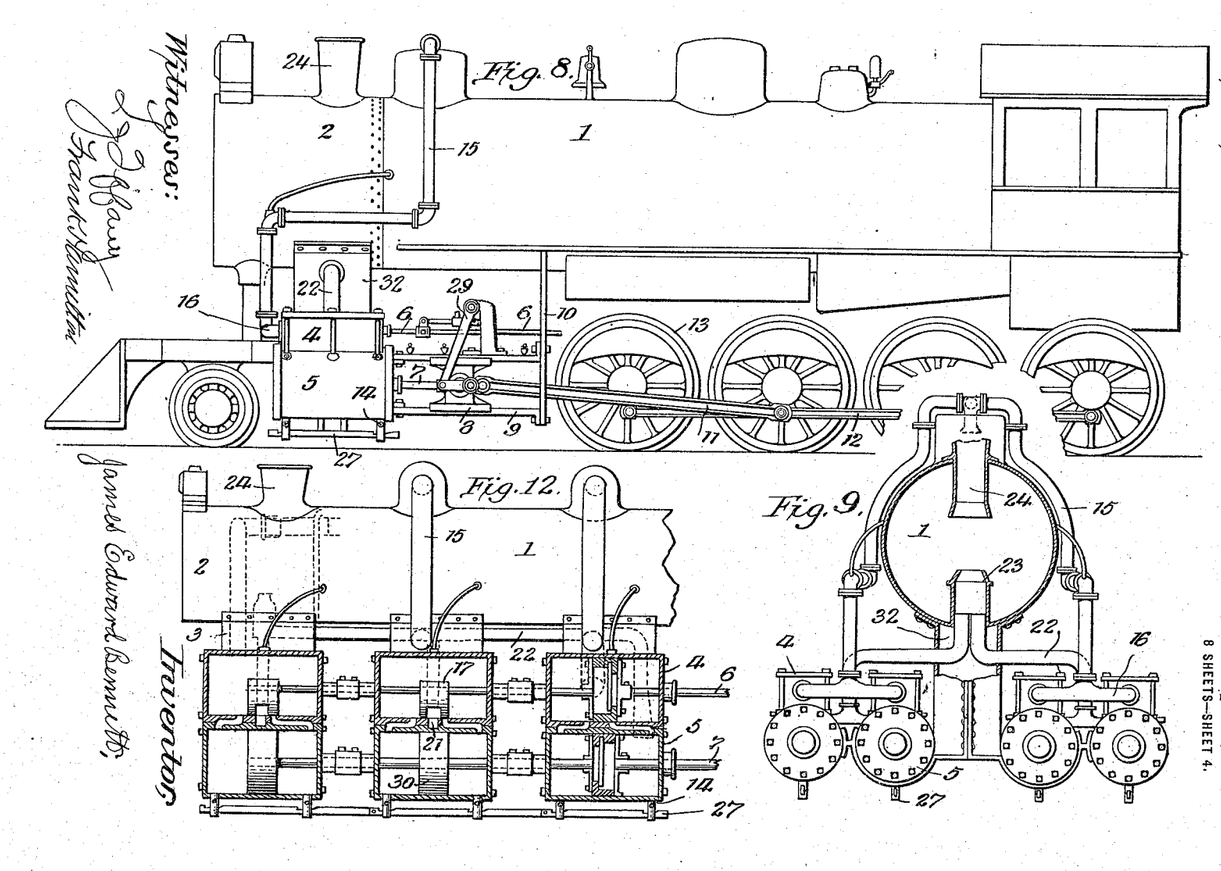
Figure 10:
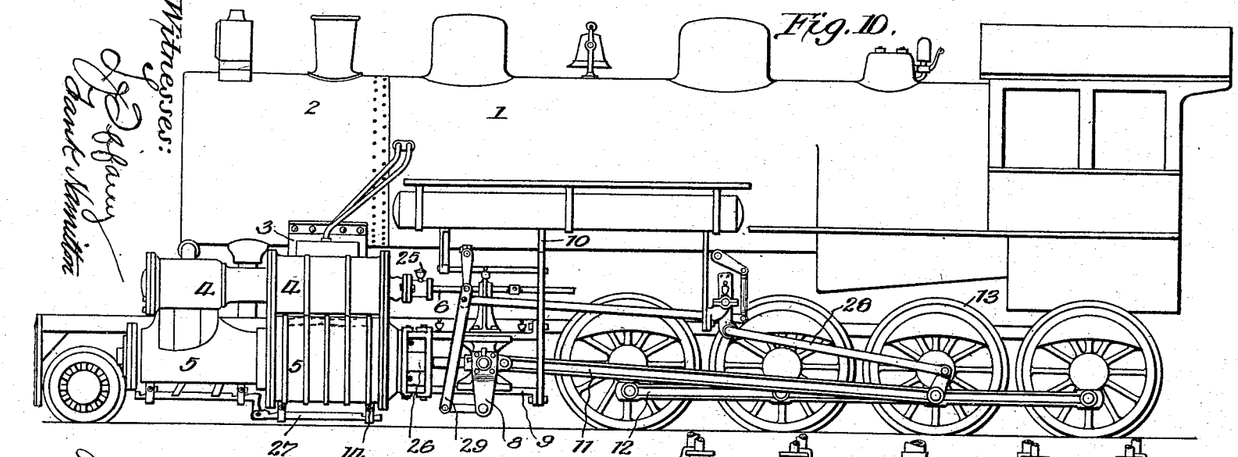
Fig. 10 is a side elevation of my invention as it appears applied to double sets of high and low pressure cylinders, constituting a double compound engine, the high and low pressure cylinders being tandem, the necessary modification of valve-operating and steam conveying mechanism being shown.
Figures 10, 14, 15:
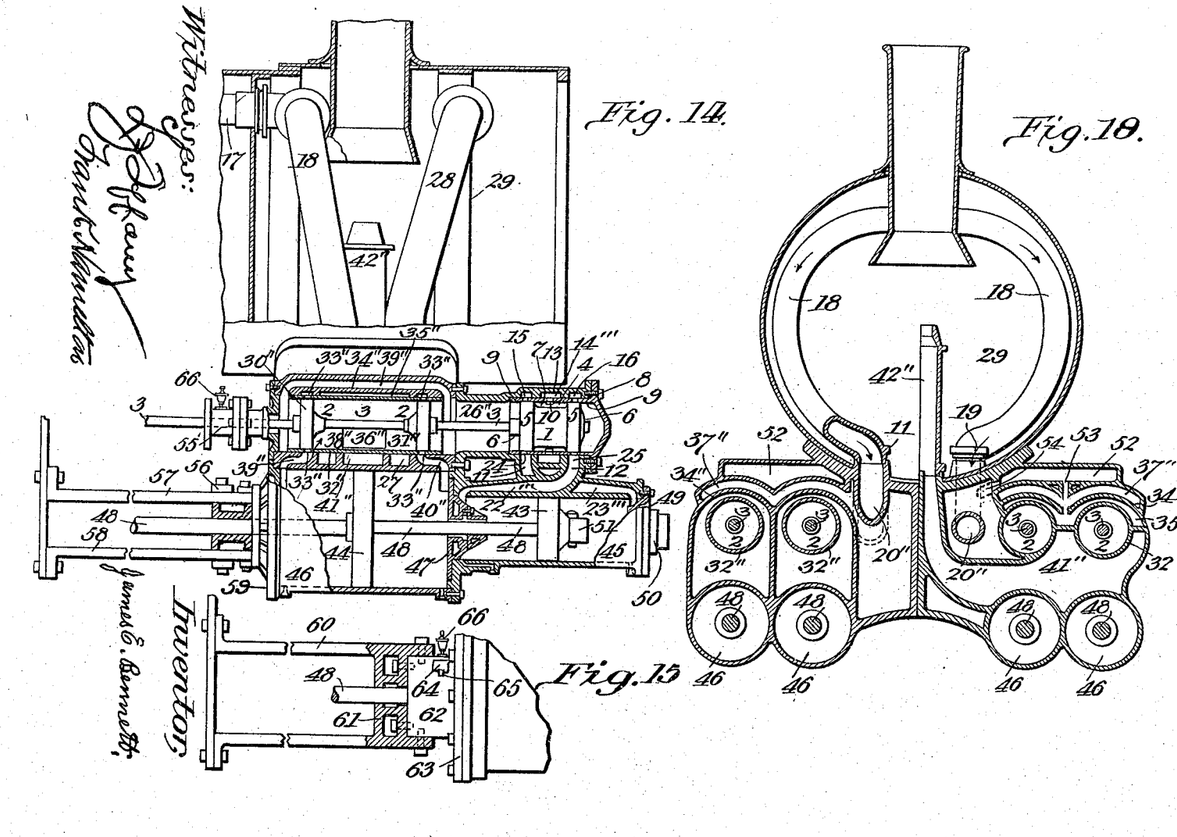
Fig. 14 is a vertical section through a part of one set of engine-gear units of the style shown in Figs. 10 and 11.
Fig. 15 is an enlarged section, partly in elevation, of a part of the apparatus shown in Fig. 14, in order to show certain details.
Figure 11:
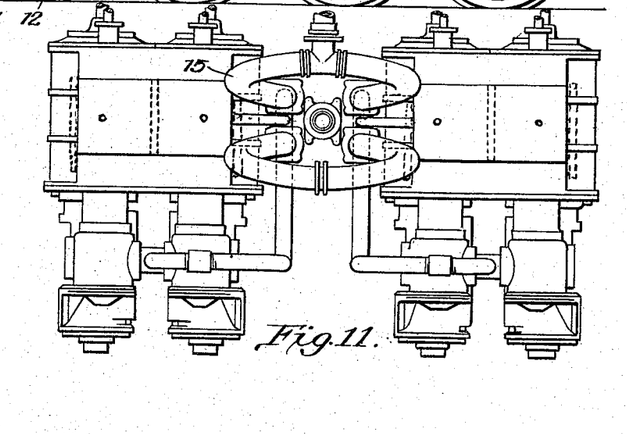
Fig. 11 is a plan view of the cylinders and steam connections shown in Fig. 10. Fig.
Figure 13:
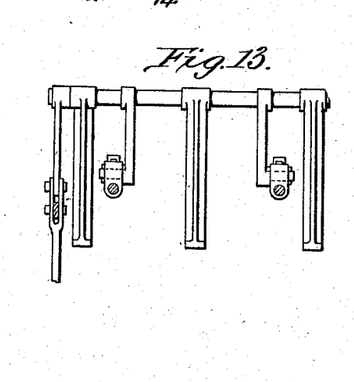
Fig. 13 is a fractional plan view of the valve-gear-mechanism for the engine-gear units shown in Figs. 10 and 11.
Figure 16:
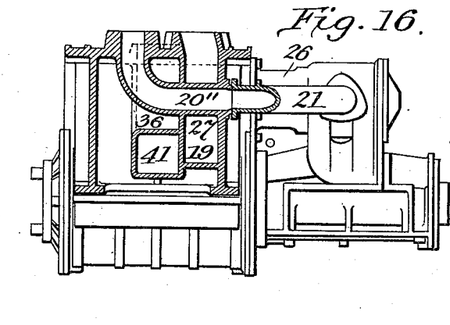
Fig. 16 is a detail section showing part of the connections from the boiler to the engine-gear units shown in Figs. 10 and 11.
Figures 19, 21:
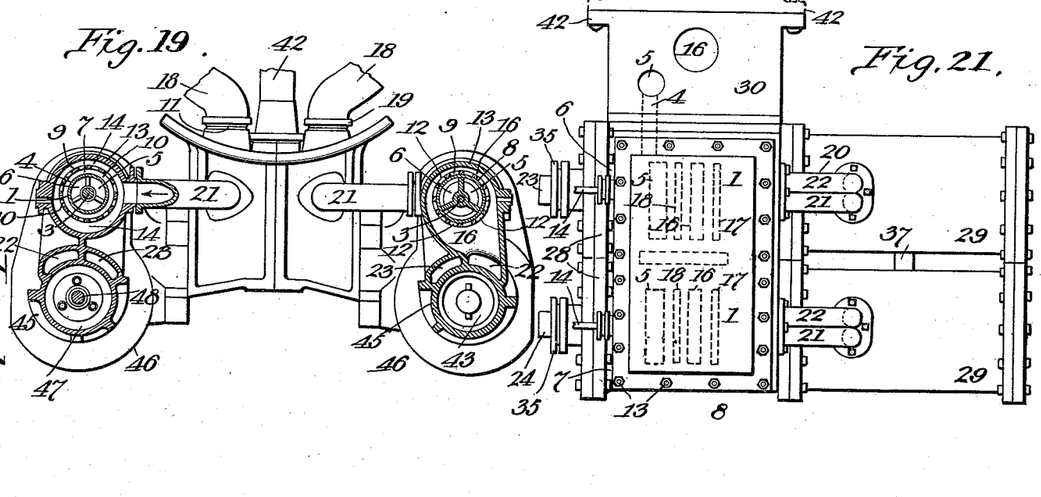
Fig. 19 is a transverse section through the valve-chambers and cylinders of the style shown in Figs. 10, 11 and 14, with special reference to Fig. 16, only a single set of engine-gear units being shown on each side.
Fig. 21 is a plan of the same and a part of the stack of the locomotive.
Figure 20:
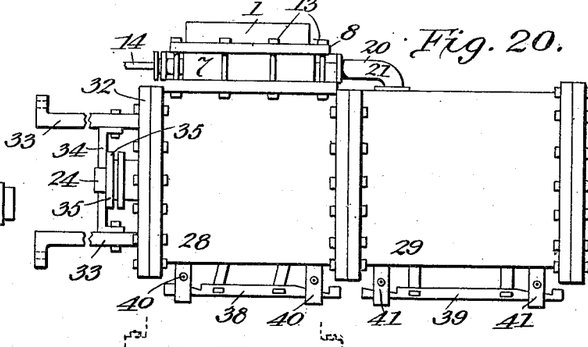
Fig. 20 is a modification of the form shown in Figs. 10, 11 and 14, in which a single valve controls steam to both high and low pressure cylinders.
Figure 22:
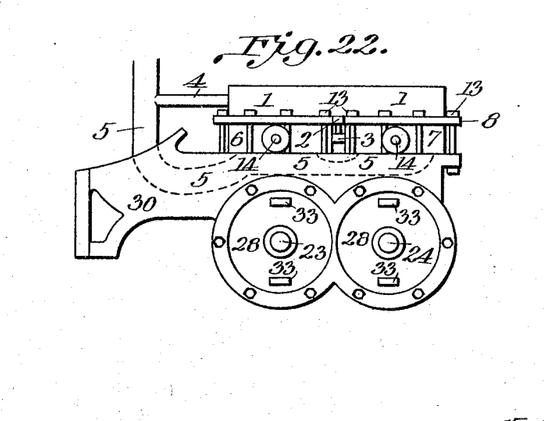
Fig. 22 is an end elevation of the same.
Figure 23:
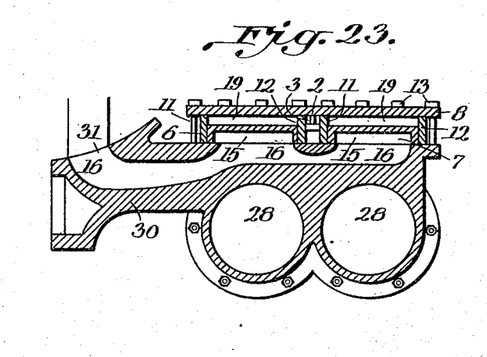
Fig. 23 is a transverse section of the same showing the valve control.
Figure 24:
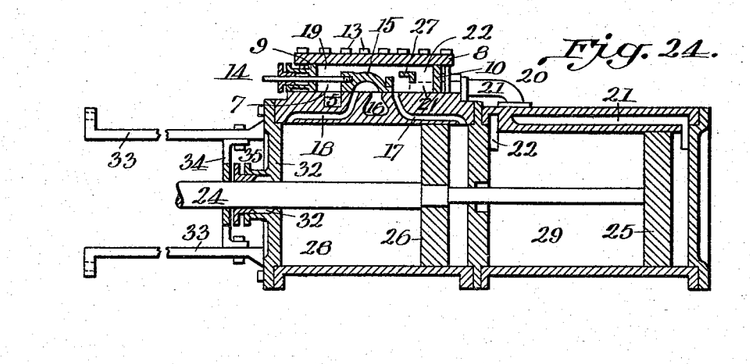
Fig. 24 is a longitudinal section of the same showing the valve control.

Referring now to Fig. 2 particularly it will be seen that the valve operating rods 6 are connected by the equalizing cross-bar 19 and the piston rods 7 are connected by the equalizing cross bar 20, so that the members of each triple set of valves and pistons move in unison, and the power transmitted as an entirety to the slides and drive wheels respectively.

To produce a powerful locomotive, such as contemplated by my invention, with the usual number of cylinders and engine-gear, would necessitate the use of cylinders and engine-gear of too large proportions to be practicable. Their size and weight would make them not only expensive to manufacture, but cumbersome and weighty and subject to rupture through their own centrifugal and other motions until constructed in such heavy style as to be economically impracticable and wasteful and unsuited to engines of this character.

My invention has the advantage of producing such a powerful locomotive without the incurring of the undesirable features above enumerated. The use of a plurality or multiplicity of small engine-gear units which can be easily erected, of comparatively light structure, secure against bursting from their own motion, all connected to drive as though integral as to power, and not, as in the prior art, merely duplicate engines which work as individual powers against a common task.

In my invention should an individual cylinder or engine-gear become impaired, it can be cut out without interfering with the rest of the organization.

In supplying steam to such a number of cylinders it is essential that the supply pipes be protected to a greater extent than usual and for this reason I have carried them to the cylinders through the protecting spaces 31 and 32.

Having thus described my invention what I claim as new therein and desire to secure by Letters Patent is:

1. A locomotive comprising a set of drive wheels, a single extended boiler, triple sets of cylinder and engine-gear units, cross-bars connecting the members of the sets of cylinder and engine-gear units so as to compel them to move in unison, and a single set of drive mechanism connecting the engine-gear units with the drive wheels.

2. A locomotive comprising a set of drive wheels, a single extended boiler, triple sets of cylinder and engine-gear units, steam conveying means from the boiler to the cylinder and engine-gear units, cross-bars connecting the members of the sets of cylinder and engine-gear units so as to compel them to move in unison, and a single set of drive mechanism between the connected cylinder and engine-gear units and the set of drive wheels.

3. A locomotive comprising a set of drive wheels, a single extended boiler, triple sets of cylinder and engine-gear units, steam conveying means from the boiler to the cylinder and engine gear units, means connecting the members of the sets of cylinder and engine-gear units so as to compel them to move in unison, and means comprising a single pitman rod and a single coupling rod connecting the triple sets of cylinder and engine-gear units with the set of drive wheels.

In testimony whereof I affix my signature in presence of two witnesses.

JAMES EDWARD BENNETT.

Witnesses:
E. P. HARNEY,
JNO. HOWK.

Copies of this patent may be obtained for five cents each, by addressing the "Commissioner of Patents, Washington, D. C."